UNITED STATES PATENT OFFICE.

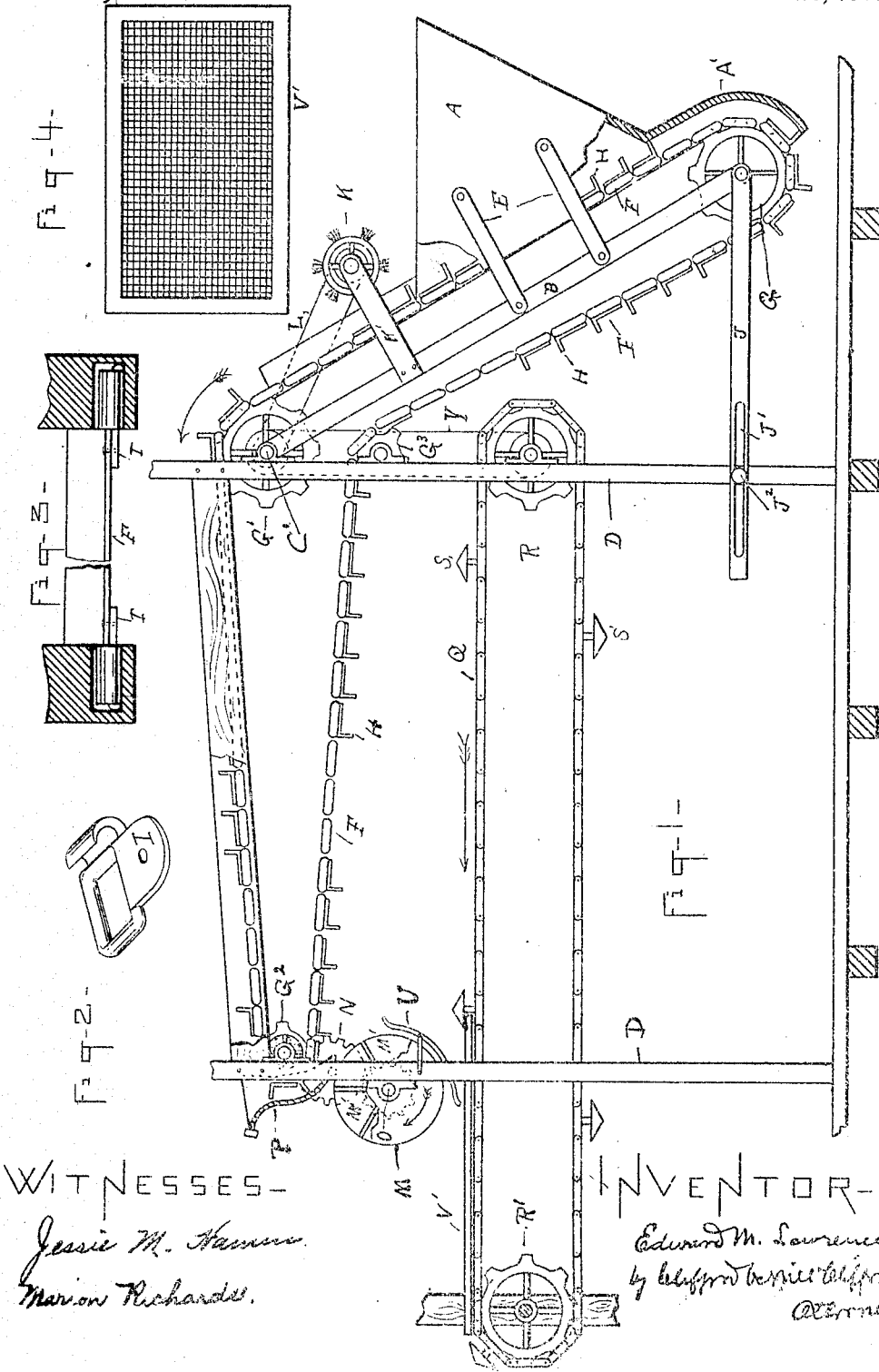

EDWARD M. LAWRENCE, OF LUBEC, MAINE.

FLAKING-MACHINE.

No. 913,018.  Specification of Letters Patent.  Patented Feb. 23, 1909.

Application filed March 7, 1908. Serial No. 419,639.

*To all whom it may concern:*

Be it known that I, EDWARD M. LAWRENCE, a citizen of the United States, and resident of Lubec, in the county of Washington, State of Maine, have invented new and useful Improvements in Flaking-Machines, of which the following is a specification.

My invention relates to improvements in fish flaking machines.

In the preparation of small fish for canning it is customary to first immerse the fish in brine and then put them upon flakes for the purpose of drying. The flakes used consist of rectangular frames in the center of which is a fine wire mesh, the frame being necessarily of considerable width in order to give sufficient rigidity to support the wire. It is found that the fish are cured more thoroughly and are of more uniform quality, when dried entirely on the mesh than on the frame at the ends and sides of the flake.

My present invention is an improvement upon the invention shown and described in Letters Patent of the United States #706,764 issued to me August 12, 1902, for improvements in fish flaking machines and has to do with an improved apparatus for flaking the fish whereby the fish are more evenly distributed upon the flakes.

In the drawings herewith accompanying and making part of this application, Figure 1 is a side elevation of my improved apparatus with parts broken away to more fully expose the parts; Fig. 2 is a perspective view of a link in the endless chain conveyer; Fig. 3 is a transverse sectional view of the main conveyer; and Fig. 4 is a plan view of a flake.

Same letters of reference refer to like parts.

It will be noted that the present invention is designed to take fish automatically from a tank, convey them to and spread them evenly upon a flake and also to prevent them from falling upon the frame of the flake the same as in my former patent above referred to. It will be noted further that in the present case the fish are maintained under positive control from the time they leave the tank until they are deposited upon the flake, whereby a more even and orderly distribution of the fish is attainable.

In said drawings A represents a hopper mounted upon a frame B, pivotally secured to a shaft C' on a stationary upright of the main frame D. The hopper is, for convenience, substantially V-shaped and is mounted upon the frame B by means of straps E. One side of the hopper is closed by an endless conveyer F passing over a sprocket G mounted at the lower extremity of the frame B and over a sprocket G' secured to shaft C. It also passes around auxiliary sprockets G² and G³ conveniently mounted upon some part of the main frame. The conveyer F has the links with and without buckets H in alternate series, the apparatus being timed so that the links without buckets will be coincident with the passing of the flake frames under the point of delivery, so that fish will only be delivered upon the screen portion of the flakes.

In consequence of the fact that some of the links of the conveyer are not provided with buckets it is necessary to provide the lower part of the hopper with a narrow extension A', such extension being equal to or greater than the spaces on the conveyer unprovided with buckets, so as to prevent fish from falling from the bottom of the hopper when the part of the conveyer without buckets is near the bottom of the hopper proper. The buckets consist of angle plates secured to lips I on the links, as seen in Fig. 3.

I regulate the number of fish taken up by the buckets by varying the angle of that part of the conveyer which carries the hopper and I maintain this part of the apparatus at any desired angle in any convenient way, as by means of an adjusting bar J provided with a slot J' through which passes a set screw J² taking into the upright D. If at any time more than the average amount of fish are taken up by any of the buckets. I prevent them from being carried forward by means of a rotary brush K mounted on brackets K' attached to the frame B, the brush rotating adjacent to the edges of the buckets and being driven by a belt L. The brush also tends to arrange the fish in horizontal position, they moving freely among themselves.

The fish are delivered at the opposite end of the machine into a rotary drum M provided with a series of radially disposed compartments M' so arranged and timed that each compartment receives the fish delivered from a single bucket. The drum M is driven by a gear connection N with the shaft O upon which gear $G^2$ is mounted. To guide the fish into the drum I provide a pivoted guard P adjacent the point where the fish leave the conveyer. At a point below the drum M I locate an endless conveyer Q for the flakes V'. This conveyer passes around sprockets R and R' and is provided with V-shaped guards S set transversely thereof and secured thereto, the lower edges being raised a sufficient distance above the carrier to give entrance to the ends of the flake frames, this part of my invention being substantially the same and operating in the same way as in my former patent above referred to. The conveyer Q is driven by a belt Y and timed to correspond with the movement of the conveyer F, the arrow indicating the direction of its movement. The fish are delivered from the drum M upon an inclined apron U and thence fall from the apron in regulated quantities and in regular order upon the flakes as they pass below it being delivered directly upon the flakes instead of being allowed to fall through a considerable space as was the case in my former patent. The apparatus may be driven by any convenient mechanism not shown.

The operation of my improved device is as follows. The small fish are placed in bulk in the hopper A. As the conveyer moves along the buckets take up small quantities which are thus conveyed under the brush which tends to place them in regular position and to prevent too many remaining on a bucket by brushing them back into the hopper. Thence they pass along and are delivered in due course to the drum and by the drum are delivered upon the apron from which they slide by gravity upon the flakes, the brush and V-shaped compartments having combined to bring the fish into horizontal positions extending transversely of the flakes.

Having thus described my invention and its use I claim:—

1. In a fish flaking machine, a main frame, an auxiliary frame pivotally secured at the top to the main frame, an endless conveyer mounted on said frames, means for varying the angle of inclination of said auxiliary frame to said main frame, a series of buckets on said conveyer, a hopper mounted on said auxiliary frame and open on the side next to the conveyer and means for imparting motion to said conveyer.

2. In a fish flaking machine, a main frame, an auxiliary frame pivotally attached at the top to the main frame, means for varying the angle of inclination of said auxiliary frame to said main frame, an endless conveyer passing over said frames, a series of buckets carried by said conveyer, the series being broken at predetermined distances, a hopper mounted upon said auxiliary frame and open on the side next to the conveyer and means for imparting motion to said conveyer.

3. In a fish flaking machine, a main frame, an auxiliary frame pivotally attached at the top to the main frame, an endless conveyer passing over said frames, and means for imparting motion thereto, a hopper mounted upon said auxiliary frame and open on the side next to the conveyer, an endless flake conveyer mounted on said main frame, in combination with a rotary receiving and spreading drum interposed between said conveyers and means for imparting motion to said conveyer and to said rotary drum, all arranged and timed to deliver the contents of the hopper intermittently upon the flake carrying conveyer.

4. In a fish flaking machine, a main frame, an auxiliary frame pivotally attached thereto, means for varying the angle of inclination of said auxiliary frame, an endless conveyer mounted on a series of sprockets set in said main and auxiliary frames, buckets mounted on said conveyer, a fish-containing hopper secured upon the auxiliary frame and open on the side next to said conveyer, a rotary distributing drum provided with radially disposed compartments adapted to receive the contents of the buckets and distribute them on the flakes, an endless flake carrier positioned below said distributing drum and means for imparting motion to the several parts.

5. In a fish flaking machine, an endless conveyer provided with a series of buckets, the series being broken at predetermined distances, and an endless conveyer provided with flakes having solid ends and reticulated centers, in combination with a rotary receiving and spreading drum provided with radially disposed compartments each adapted to receive the contents of a single bucket and distribute the same upon the flakes, all arranged and timed to spread the contents of the buckets upon the reticulated portions only of the flakes.

In testimony whereof I have signed my name to this specification in presence of two subscribing witnesses this 26th day of February, 1908.

EDWARD M. LAWRENCE.

In presence of—
GLENN A. LAWRENCE,
WM. F. BRAUN.